United States Patent [19]

Tremoulet, Jr. et al.

[11] Patent Number: 4,858,967
[45] Date of Patent: Aug. 22, 1989

[54] HIGH PRESSURE HOSE FITTING AND METHOD FOR SEALING HIGH PRESSURE HOSES TO FITTINGS

[75] Inventors: Olivier L. Tremoulet, Jr., Edmonds; Chidambaram Raghavan, Renton, both of Wash.

[73] Assignee: Flow Systems, Inc., Kent, Wash.

[21] Appl. No.: 180,546

[22] Filed: Apr. 12, 1988

[51] Int. Cl.⁴ ............................................. F16L 33/00
[52] U.S. Cl. .................................. 285/256; 285/259; 285/100; 285/107; 285/331
[58] Field of Search ............... 285/256, 258, 259, 331, 285/100, 107

[56] References Cited

U.S. PATENT DOCUMENTS

| | | | |
|---|---|---|---|
| 1,481,341 | 1/1924 | Bersted | 285/256 |
| 2,008,175 | 7/1935 | Cowles | 285/84 |
| 2,463,293 | 3/1949 | Mentel | 285/256 X |
| 2,661,225 | 12/1953 | Lyon | 285/84 |
| 2,685,458 | 8/1954 | Shaw | 285/74 |
| 2,687,904 | 8/1954 | Tornblom | 285/256 X |
| 2,731,279 | 1/1956 | Main | 285/86 |
| 2,797,111 | 6/1957 | Beazley | 285/149 |
| 3,525,542 | 8/1970 | Belart et al. | 285/256 |
| 4,106,526 | 8/1978 | Szentmihaly | 138/109 |
| 4,758,029 | 7/1988 | Davis | 285/253 |

Primary Examiner—Joseph Falk
Attorney, Agent, or Firm—Ashen Golant Martin & Seldon

[57] ABSTRACT

A high pressure hose fitting, and method for sealing the hose to a fitting, is disclosed for use with hoses of the type including a linear disposed about an axially extending passageway, and a reinforcement layer circumventing the liner. The liner is preferably pulled slightly beyond the edge of the reinforcement layer to form a protruding edge region. An end fitting, having a flange with a liner-receiving groove, is inserted into the passageway until the protruding edge of the liner contacts the end wall of the groove, and the flange abuts the reinforcement layer. A swagable collar circumventing the foregoing components is swaged radially inwardly to clamp the liner on its outside diameter.

15 Claims, 1 Drawing Sheet

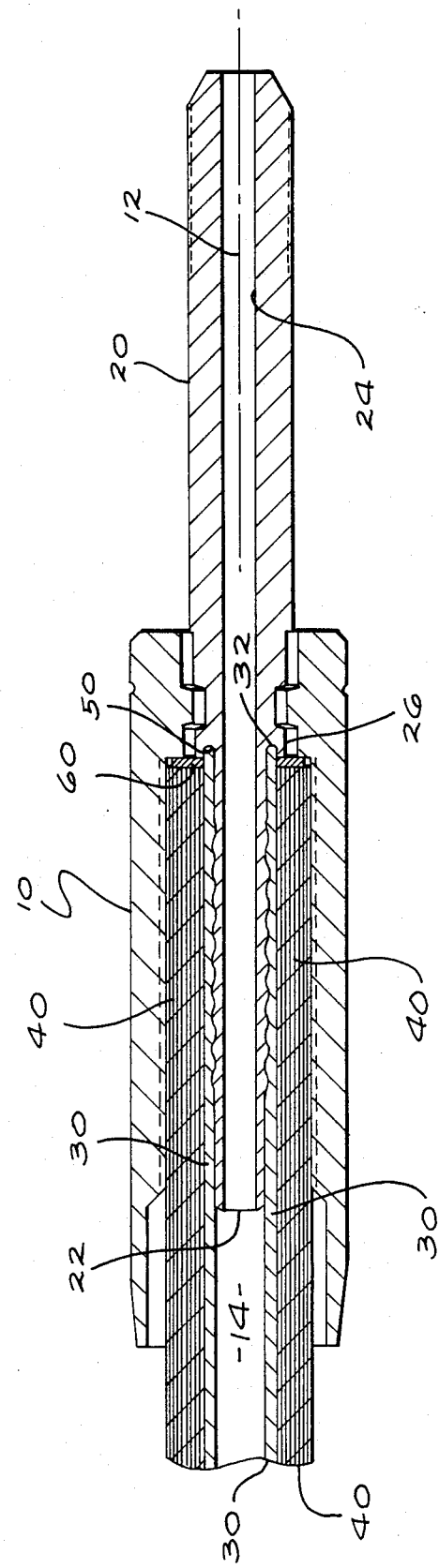

HIGH PRESSURE HOSE FITTING AND METHOD FOR SEALING HIGH PRESSURE HOSES TO FITTINGS

This invention relates to tubular conduits and specifically to the end structures thereof. More specifically, this invention relates to an end fitting for use with high pressure hoses and to a method for sealing high pressure hoses to fittings.

BACKGROUND OF THE INVENTION

As used herein, the term "high pressure" is used to denote pressures in excess of 20,000 psi. Pressures in excess of 20,000 psi are experienced in a number of technical areas including, but not limited to, high pressure water jet cutting. Although this particular application will be used as an example throughout this specification, it should be understood that the described invention is not so limited.

High pressure water jet cutting systems typically compress water, or other convenient fluid, to working pressures in excess of 20,000 psi. Some of the systems, such as those manufactured by Flow Systems, Inc., in Kent Washington, operate at working pressures in the range of 40,000 to 60,000 psi. Although the highest burst pressure dealt with in SAE specifications for hoses is in SAE 100R11 for a 3/16 inch I.D. hose, hoses capable of carrying the pressurized fluid in a water jet cutting system should preferably have burst pressures in the range of 100,000–110,000 psi.

As those skilled in the art recognize, the high pressure hoses of the type described above comprise an axially-extending liner of generally annular cross-section generally circumventing the hoses' passageway, and an axially extending reinforcement layer generally circumventing the liner. The liner is typically formed from an elastomer or polymer. The reinforcement layer is typically formed by as many as eight wraps of wire, each of which circumvent the exterior of the liner at a different angle to the hose axis than the others.

The hose is coupled to the source or destination of the conducted fluid by means of a generally tubular end fitting whose internal passageway is in fluid communication with the hose's passageway. The end fitting, which is typically formed from a metal, has a leading end portion inserted within the end of the hose.

To seal the fitting to the hose, a metal sleeve is typically used. The sleeve circumvents the end of the hose, and is swaged radially inwardly to form the seal.

In designing high pressure end fittings, as the term "high pressure" is used herein, problems which are not significant at lower pressures become significant. As the high pressure sealing arrangement becomes more complex, the number of ways in which the seal can fail multiplies. In addition, the complexity of some seal arrangements in known high pressure end fittings require so much space that the fittings are usable with large bore hoses or minimally thick reinforcement layers.

Accordingly, those who design high pressure fittings have been expending a substantial amount of effort to discover an effective high pressure end fitting which is usable with relatively small diameter hoses (e.g. 3/16 inch), particularly where relatively thick reinforcement layers are needed.

DESCRIPTION OF THE PRIOR ART

U.S. Pat. No. 4,106,526 is directed to a high temperature end fitting wherein the inserted end of the end fitting is provided with a series of radially outward projections. The swaged sleeve is provided with a corresponding plurality of radially inward projections which cooperated with the outward projections to grip the hose between the projections, compressing the elastomer liner into cells defined by the corresponding inward and outward projections.

U.S. Pat. No. 3,008,736 discloses a hose coupling which is described as a high pressure coupling without any specificity concerning the magnitude of pressure involved. The coupling comprises a guide member which is inserted into the hose, and a tubular connector member circumventing the hose. A sharp leading edge of the connector member separates the reinforcing layer from the hose liner as the insert and connector are twisted onto the hose. The reinforcement layer is thereafter crimped between the connector and an externally mounted ferrule, while the liner is forced by an externally mounted spring into grooves formed on the insert to effect a seal.

U.S. Pat. No. 2,731,279 is directed to a hose coupling wherein a tubular insert fits within the end portion of the hose. The tubular insert includes an externally threaded flange having a sharp-edged, wedge-shaped, axially extending, annular leading edge which is separated from the main body of the insert by a close-ended slot. As the insert is forced into the hose, the annular leading edge cuts into the liner of the hose, creating an annular flap of the liner material which enters the close-ended slot. The exterior portion of the liner, overlying the flap, together with the reinforcement layer overlying said exterior portion, is gripped between the sleeve and an externally threaded socket which is tightened onto the flange of the insert. The interior of the hose is described as being sealed by the enclosure of the flap by the opposing walls of the slot.

The arrangement described in the foregoing patent appears suitable for low pressure applications, wherein the thickness of the reinforcement layer may be sufficiently thin to permit a sufficiently thick liner to be cut by a wedge-shaped member to form a sealable flap. In high pressure applications, however, it will be recognized that a typical hose has a liner approximately 0.032 inches thick, and a reinforcement layer approximately 0.100 thick. Further, the seal described in the patent is ineffective at high pressures of the type to which the present invention is directed.

SUMMARY OF THE INVENTION

The invention herein provides a hose end unit comprising an axially extending hose having an inner axially extending passageway, an axially extending liner of generally annular cross-section generally circumventing said passageway, and an axially extending reinforcement layer generally circumventing the liner. The hose has an end portion where the liner extends axially beyond the reinforcing layer, terminating in a protruding end region adjacent said end portion.

A generally tubular end fitting has a leading end portion inserted within the end region of the liner. The leading portion includes means for enveloping at least a portion of the protruding end region of the liner. A sleeve circumventing the end portion of the hose is swaged radially inwardly to clamp the liner within the enveloping means of the tubular end fitting. Sealing is thereafter effectuated by the expansion of the liner against the enveloping means in response to fluid pressure within the hose.

Additional information and details concerning the invention may be appreciated from the following description of the preferred embodiment, of which the drawing is a part.

DESCRIPTION OF THE DRAWING

The sole FIGURE is a longitudinal sectional view, in schematic, of a hose end unit constructed in accordance with the invention.

DETAILED DESCRIPTION OF THE PREFERRED EMBODIMENT

The FIGURE is a longitudinal sectional view, in schematic, of a hose end unit constructed in accordance with the invention. The illustrated unit comprises the end portion of a high pressure hose formed from a generally cylindrical liner 30 which generally circumvents the passageway 14 of the hose, and a reinforcement layer 40 which generally circumvents the liner. The hose is illustrated as being disposed about an axis 12.

The liner 30 extends approximately 0.08 inches beyond the end of the reinforcement layer to terminate in a protruding end region 32 axially adjacent the end portion of the hose. The liner may be exposed by cutting the reinforcement layer back or by pulling the liner out beyond the end of the hose. Accordingly, the liner is preferably formed from a relatively stiff, but stretchable, material such as nylon or teflon and is not bonded to the reinforcement layer.

The reinforcement layer 40 preferably comprises a plurality of layers of helically wound metal wires formed from a high strength steel alloy. Each of the wire layers is preferably wound about the liner at a uniquely different angle, so that the combined multiplicity of angles maximizes the burst strength of the hose.

A generally tubular end fitting 20 has a leading end portion 22 inserted within the end region of the liner The end fitting, which is made of a high strength steel alloy, includes an internal passageway 24 in fluid communication with the hose's passageway 14 after insertion.

The leading portion of the end fitting 20 includes a flange 26 having a generally circumferential liner-receiving groove 50 for receiving and enveloping the protruding end portion 32 of the liner. Specifically the liner is received between the radially inner and outer walls of the groove 50, so that the walls of the groove respectively engage the radially inner and outer surfaces of the liner when the end unit is swaged, as described below.

As illustrated in FIG. 1, the groove 50 terminates in a generally concave manner so that the liner end nests against the end of the groove. It is understood that a suitable shaped flange of generally concave shape may instead be provided without departing from the spirit of the invention.

An annular washer 60 is axially positioned at the end region of the hose between the reinforcement layer 40 and the grooved flange 26 of the end fitting 20. The internal diameter of the washer 60 is sufficiently large to provide a close sliding fit about the liner's protruding end 32. The outside diameter of the washer 60 is larger than the crimped outside diameter of the reinforcement layer after swaging. The washer is, therefore, itself swaged to a smaller diameter on both its inside diameter and outside diameter, thus assuring intimate contact with the outside diameter of the protruding liner end 32. In practice, a washer having a thickness of 0.030 inches has been used with satisfactory results.

The depth of the groove is preferably sufficient to accommodate the entire portion of the protruding liner which extends from the I.D. of the washer 60. Accordingly, the groove is approximately 0.05 inches deep when the washer and protruding portion 32 of the liner have the aforedescribed dimensions.

A tubular sleeve 10 circumvents the end portion of the hose. After the aforedescribed components have been assembled in the illustrated manner, the sleeve 10 is swaged radially inwardly to clamp the leading portion of the end fitting to the liner, and to clamp the hose nipple and sleeve together.

Upon swaging, the closed-ended groove 50 wraps around the end of the liner 30 and seals the liner on its outside diameter. Instead of depending upon the swage pressure for sealing, the aforedescribed unit utilizes the pressure of the conducted fluid to expand the liner and seal it against the outside diameter of the groove 50. Accordingly, it is desirable that the outer surface of the protruding liner be free of defects which inhibit sealing contact by the groove wall, and some degree of surface smoothening may be performed as required.

The washer 60 prevents the fluidized liner material from extruding into any gap between the reinforcement layer 40 and the flange 26 of the end fitting 20, and pushing the inner layers of the helically wound wires back from the groove. Under such circumstances, the outer surface of the protruding liner material becomes unsupported, resulting in ineffective sealing and consequential failure of the unit. The washer disperses any such fluidic force among all the layers of the reinforcement layer, and adds support to the protruding liner material.

The aforedescribed embodiment provides a high pressure hose end unit particularly suitable for applications in which the working pressure of the conducted fluid exceeds the yield stress of the liner material, causing the liner material to flow plastically.

While the foregoing description includes detail which will enable those skilled in the art to practice the invention, it should be recognized that the description is illustrative in nature and that many modifications and variations will be apparent to those skilled in the art having the benefit of these teachings It is accordingly intended that the invention herein be defined solely by the claims appended hereto and that the claims be interpreted as broadly as permitted in light of the prior art.

I claim:

1. A hose end unit comprising:
   an axially extending hose having an inner axially extending passageway, an axially extending liner of generally annular cross-section generally circumventing said passageway, and an axially extending reinforcement layer generally circumventing the liner,
   the hose having an end portion,
   the liner extending axially beyond the reinforcing layer to terminate in a protruding end region adjacent said end portion;
   a generally tubular end fitting having a leading end portion inserted within the end region of the liner, said leading portion including means for enveloping at least a portion of the protruding end region of the liner; and a sleeve circumventing the end portion of the hose and swaged radially inwardly to clamp the leading portion of the tubular end fitting to the liner, the liner being thereafter expanded by fluid pressure within the hose to seal against the enveloping means.

2. The hose end unit of claim 1 wherein the end fitting has a generally concave flange spaced from its leading end for contacting the protruding end of the liner.

3. The hose end unit of claim 2 wherein the radially outer surface of the flange is shaped to extend axially along the outer surface of the liner towards the protective layer.

4. The hose end unit of claim 1 wherein the end fitting has a generally circumferential flange spaced from its leading end for contacting the protruding end of the liner, the flange having a generally circumferential liner-receiving groove formed therein for receiving the protruding end of the liner between the radially inner and outer walls of the groove so that the walls of the groove respectively engage the inner and outer surfaces of the liner when the sleeve is swaged.

5. The hose end unit of claim 4 wherein the groove is of sufficient depth to accommodate substantially the entire protruding end portion of the liner.

6. The hose end unit of claim 5 including a ring-like member positioned at the end region of the hose between the reinforcement layer and the flange face of the end fitting, the ring-like member being sized to partially overlap the groove while permitting the protruding end of the liner to pass therethrough into the groove.

7. The hose end unit of claim 3 wherein the concavity of the flange is sufficiently deep to accommodate substantially the entire protruding end portion of the liner.

8. The hose end unit of claim 7 including a ring-like member positioned at the end region of the hose between the reinforcement layer and the flange face of the end fitting, like member being sized to partially overlap the the ring-like member being sized to partially overlap the concave surface of the flange while permitting the protruding end of the liner to pass therethrough into the concave region of the flange.

9. The hose end unit of claim 1 including a barrier means axially positioned between the end of the reinforcement layer and the end of the protruding liner for dispersing the force of any fluid emanating from the enveloping means throughout the radial thickness of the protective layer to inhibit axial movement of the protective layer away from the protruding end region of the liner.

10. The hose end unit of claim 9 wherein the barrier means includes a generally annular member having an internal diameter encompassing at least a portion of the protruding end region of the liner so that the protruding end of the liner passes therethrough into the enveloping means, and having an outside diameter sufficiently large to abut substantially the radially extending thickness of the reinforcement layer.

11. The hose end unit of claim 10 wherein the inside diameter of the annular member is sized to provide a tight sliding fit with respect to the encompassed liner portion.

12. A method for forming a high pressure coupling for a hose of the type including an axially extending liner of generally annular cross-section circumventing a fluid passageway, and an axially extending reinforcement layer generally circumventing the liner, the method comprising the steps of:

axially extending the liner beyond the reinforcing layer so that the liner terminates in a protruding end region adjacent to the end of the hose;

inserting a generally tubular end fitting into the end region of the liner until the protruding portion of the liner nests within a liner-receiving structure formed in the end fitting;

circumventing the liner-receiving structure and overlying reinforcement layer with a swagable collar; and deforming the collar radially inwardly to clamp the liner within the liner-receiving structure so that the subsequent expansion of the liner by fluid pressure within the passageway seals the liner against the liner-receiving structure.

13. The method of claim 12 including the step of forming a liner-receiving groove in a flange of the end fitting, the flange being axially spaced along the inserted portion of the fitting to abut the reinforcement layer of the hose when the fitting is fully inserted.

14. The method of claim 13 including the step of positioning a generally annular member between the reinforcement layer and flange so that the protruding region of the liner passes through the member's internal diameter.

15. The method of claim 13 including the step of dispersing the force of any fluid in the groove over the substantial portion of the thickness of the reinforcement layer.

* * * * *